(12) United States Patent
Maeda et al.

(10) Patent No.: US 7,170,615 B2
(45) Date of Patent: Jan. 30, 2007

(54) IMAGE PROCESSING DEVICE INCLUDING IMAGE DATA MANAGEMENT CAPABILITIES

(75) Inventors: Hiroshi Maeda, Kashihara (JP); Youichi Kimura, Nabari (JP); Rieko Toda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 646 days.

(21) Appl. No.: 09/185,212

(22) Filed: Nov. 3, 1998

(65) Prior Publication Data

US 2002/0131064 A1    Sep. 19, 2002

(30) Foreign Application Priority Data

Nov. 14, 1997    (JP)    ................................. 9-313028

(51) Int. Cl.
    B41B 23/00    (2006.01)
    B41B 25/24    (2006.01)
(52) U.S. Cl. .................... 358/1.13; 358/1.14; 358/1.18
(58) Field of Classification Search .................. 399/75, 399/76, 77, 82, 382; 358/1.1, 1.12, 1.13, 358/1.14, 1.15, 1.16, 1.17, 296, 496, 498, 358/402, 403, 407, 448, 452, 460, 462, 467
    See application file for complete search history.

(56) References Cited

U.S. PATENT DOCUMENTS 5,682,549 A * 10/1997 Tanaka et al. .................. 710/8
5,801,837 A * 9/1998 Hamanaka et al. ......... 358/296
5,923,013 A * 7/1999 Suzuki et al. ................. 358/1.1
5,960,247 A * 9/1999 Morikawa .................... 399/382
6,088,135 A * 7/2000 Kusumoto ................... 358/498

FOREIGN PATENT DOCUMENTS

JP    02066586 A    3/1990

* cited by examiner

Primary Examiner—Twyler Lamb
Assistant Examiner—Myles D. Robinson
(74) Attorney, Agent, or Firm—David G. Conlin; David A. Tucker; Edwards Angell Palmer & Dodge LLP

(57) ABSTRACT

An image processing device includes: (1) a scanner unit for inputting image data; (2) an image memory for storing the image data; (3) a machine control board for confirming the characteristics of the image data; (4) a binary image processing section for performing image processing with respect to the image data; (5) an operation key group for setting a processing mode of the binary image processing section; and (6) a main-CPU for managing (i) the characteristics of each image data confirmed by the machine control board and (ii) a processing mode set by the operation key group, as management information, with reference to the corresponding image data stored in the image memory. The binary image processing section performs image processing with respect to the image data according to the management information managed by the main-CPU. Since the image data is processed according to its management information managed in the management table, it is possible to manage the image processing so that appropriate image processing is applied to each inputted image data, and that time-wasting image processing is not applied to image data improperly inputted.

16 Claims, 13 Drawing Sheets

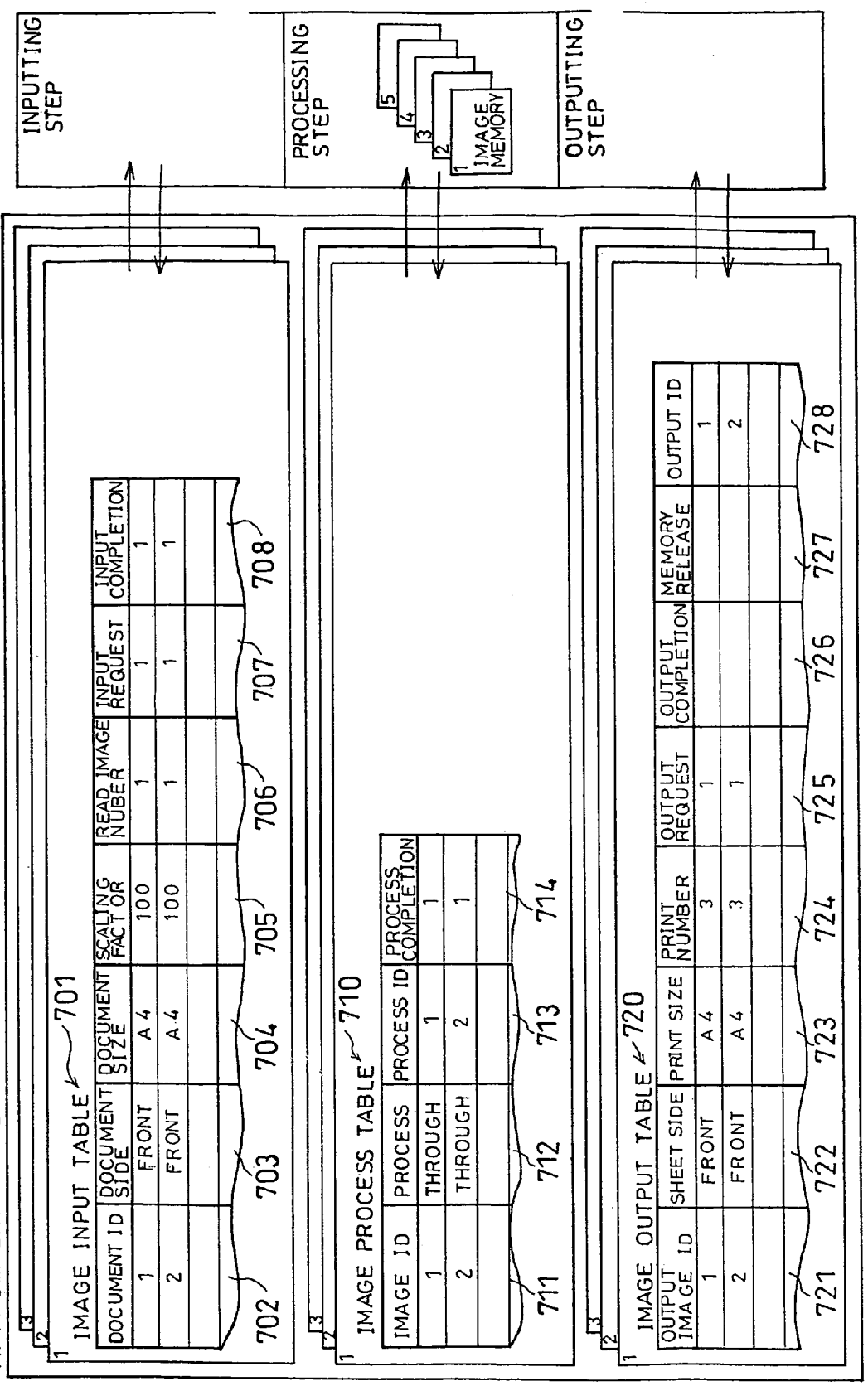

FIG.5 (a)

IMAGE INPUT TABLE ~701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 0 | 0 |
| | | | | | | |
| | | | | | | |

IMAGE INPUT TABLE ~701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 1 | 1 |
| 2 | FRONT | A4 | 100 | 1 | 1 | 0 |
| 3 | FRONT | A4 | 100 | 1 | 1 | 0 |

FIG.5 (c)

IMAGE INPUT TABLE ~701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 1 | 1 |
| 2 | FRONT | A4 | 100 | 1 | 1 | 1 |
| 3 | FRONT | A4 | 100 | 1 | 1 | 1 |

FIG.6(a)

IMAGE PROCESS TABLE ~710

| IMAGE ID | PROCESS | PROCESS ID | PROCESS COMPLETION |
|---|---|---|---|
| 1 | THROUGH | 1 | 0 |
| 2 | THROUGH |  | 0 |
| 3 | THROUGH |  | 0 |

IMAGE PROCESS TABLE ~710

| IMAGE ID | PROCESS | PROCESS ID | PROCESS COMPLETION |
|---|---|---|---|
| 1 | THROUGH | 1 | 1 |
| 2 | THROUGH | 2 | 1 |
| 3 | THROUGH | 3 | 1 |

FIG. 7 (a)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | 1 | 0 | 0 | | 1 |
| 2 | FRONT | A4 | 1 | 0 | 0 | | 2 |
| 3 | FRONT | A4 | 1 | 0 | 0 | | 3 |

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | 1 | 1 | 1 | 1 | 1 |
| 2 | FRONT | A4 | 1 | 1 | 0 | | 2 |
| 3 | FRONT | A4 | 1 | 1 | 0 | | 3 |

FIG. 7 (c)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | 1 | 1 | 1 | 1 | 1 |
| 2 | FRONT | A4 | 1 | 1 | 1 | 1 | 2 |
| 3 | FRONT | A4 | 1 | 1 | 1 | 1 | 3 |

FIG.8 (a)

IMAGE INPUT TABLE 701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 0 | 0 |
|   |   |   |   |   |   |   |
|   |   |   |   |   |   |   |

IMAGE INPUT TABLE 701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 1 | 1 |
| 2 | FRONT | A4 | 100 | 1 | 1 | 0 |
| 3 | FRONT | A4 | 100 | 1 | 1 | 0 |

FIG.8 (c)

IMAGE INPUT TABLE 701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 1 | 1 |
| 2 | FRONT | A4 | 100 | 1 | 1 | 1 |
| 3 | FRONT | A4 | 100 | 1 | 1 | 1 |

FIG. 9 (a)

IMAGE PROCESS TABLE 710

| IMAGE ID | PROCESS | PROCESS ID | PROCESS COMPLETION |
|---|---|---|---|
| 1 | COMPOSITION WITH 2 | 4 | 0 |
| 2 | COMPOSITION WITH 1 | 4 | 0 |
| 3 | THROUGH | 4 | 0 |

IMAGE PROCESS TABLE 710

| IMAGE ID | PROCESS | PROCESS ID | PROCESS COMPLETION |
|---|---|---|---|
| 1 | COMPOSITION WITH 2 | 4 | 1 |
| 2 | COMPOSITION WITH 1 | 4 | 1 |
| 3 | THROUGH | 3 | 1 |

FIG.10 (a)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | 1 | 0 | 0 | | 4 |
| 2 | FRONT | A4 | 1 | 0 | 0 | | 3 |

FIG.10 (b)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | 1 | 1 | 1 | 1 | 4 |
| 2 | FRONT | A4 | 1 | 1 | 0 | | 3 |

FIG.10 (c)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | 1 | 1 | 1 | 1 | 4 |
| 2 | FRONT | A4 | 1 | 1 | 1 | 1 | 3 |

FIG.11 (a)

IMAGE INPUT TABLE ~701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 0 | 0 |

IMAGE INPUT TABLE ~701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 1 | 1 |
| 2 | FRONT | A4 | 100 | 1 | 1 | 0 |
| 3 | FRONT | A4 | 100 | 1 | 1 | 0 |

FIG.11 (c)

IMAGE INPUT TABLE ~701

| DOCUMENT ID | DOCUMENT SIDE | DOCUMENT SIZE | SCALING FACTOR | READ IMAGE NUMBER | INPUT REQUEST | INPUT COMPLETION |
|---|---|---|---|---|---|---|
| 1 | FRONT | A4 | 100 | 1 | 1 | 1 |
| 2 | FRONT | A4 | 100 | 1 | 1 | 1 |
| 3 | FRONT | A4 | 100 | 1 | 1 | 1 |

FIG.12 (a)

IMAGE PROCESS TABLE ~710

| IMAGE ID | PROCESS | PROCESS ID | PROCESS COMPLETION |
|---|---|---|---|
| 1 | BINARY-CODING | 4 | 0 |
| 2 | BINARY-CODING | | 0 |
| 3 | BINARY-CODING | | 0 |

FIG.12 (b)

IMAGE PROCESS TABLE ~710

| IMAGE ID | PROCESS | PROCESS ID | PROCESS COMPLETION |
|---|---|---|---|
| 1 | BINARY-CODING | 4 | 1 |
| 2 | BINARY-CODING | 5 | 1 |
| 3 | BINARY-CODING | 6 | 1 |

FIG. 13 (a)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | | 0 | 0 | | 6 |
| 2 | FRONT | A4 | | 0 | 0 | | 5 |
| 3 | FRONT | A4 | | 0 | 0 | | 4 |

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | | 1 | 1 | 1 | 6 |
| 2 | FRONT | A4 | | 1 | 0 | | 5 |
| 3 | FRONT | A4 | | 1 | 0 | | 4 |

FIG. 13 (c)

IMAGE OUTPUT TABLE 720

| OUTPUT IMAGE ID | SHEET SIDE | PRINT SIZE | PRINT NUMBER | OUTPUT REQUEST | OUTPUT COMPLETION | MEMORY RELEASE | OUTPUT ID |
|---|---|---|---|---|---|---|---|
| 1 | FRONT | A4 | | 1 | 1 | 1 | 6 |
| 2 | FRONT | A4 | | 1 | 1 | 1 | 5 |
| 3 | FRONT | A4 | | 1 | 1 | 1 | 4 |

IMAGE PROCESSING DEVICE INCLUDING IMAGE DATA MANAGEMENT CAPABILITIES

FIELD OF THE INVENTION

The present invention relates to an image processing device for performing image processing with respect to inputted image data, converting the image data so as to have a desired image expression, and outputting the resulting image data. The present invention more specifically relates to an image processing device capable of managing, for each inputted image, contents of image processing and the image data which has undergone the image processing.

BACKGROUND OF THE INVENTION

There has conventionally been an image processing device for performing predetermined processing selected from various image processing functions thereof with respect to a document image inputted from a document image reading section, and outputting the processed image from a printer section. The image processing device has been strongly desired to process a large volume of documents efficiently in a short time. In order to meet such a strong desire, for example, a digital copying machine for automatically processing and outputting a large volume of documents has been developed.

In addition, a multi-functional digital copying machine has been commercialized and available on the market. The multi-functional digital copying machine can not only output from a printer section a document image inputted from a document reading section, but also output, by using a facsimile function and a printer function, an image inputted from an external device.

Such image processing devices are required to be built to meet basic specifications to achieve high-speed-operation, high-quality-image-production, multifunction, lowcost, low-energy-consumption. Furthermore, it is strongly desired that the image processing devices should rapidly and accurately perform the whole processing from reading of a document image to outputting of the inputted image, and recover from troubles such as a jam.

In some digital copying machines, a recirculating automatic document feeder is provided so as to meet the demand for improving the operation efficiency. If a jam occurs when reading a document in the recirculating automatic document feeder, smooth recovery from the jam is essential for achieving an efficient operation.

If recovery from a trouble cannot be carried out smoothly, the operation efficiency and reliability of the device are remarkably decreased. Thus, various devices for achieving smooth recovery from a trouble have been disclosed.

For example, Japanese Publication of Unexamined Patent Application No. 66586/1990 (Tokukaihei 2-66586) discloses an image processing device that smoothly recovers from a jam in the following manner. Specifically, if the image processing device detects that a document is placed on a platen with a different side facing up when starting copying, the document is automatically turned over. This arrangement saves the operator from inconvenience to reset documents one by one.

More specifically, according to the above-mentioned publication (Tokukaihei 2-66586), the image processing device is provided with a document side detecting section, a document recovery processing section, and a judging section for judging whether a discharge document has been copied or not. The document side detecting section detects which side (surface) of the document on the platen faces up. The document recovery processing section compares the detected document side with a document side to be copied next, and turns upside down the document if a different side faces up. If the image processing device detects that a document is placed on a platen with a different side facing up when starting copying, the document is automatically turned over. In addition, when the image processing device is caused to stop, it works out from which page the processing should be restarted, by judging from the number of copy sheets and the documents to which the processing is performed successfully, and determines whether a document purge is necessary or not. This arrangement saves the operator from inconvenience to reset documents one by one, and improves the operation efficiency in recovering from a jam.

However, as described above, since the image processing devices are desired to efficiently process the images inputted from external devices as well as a large volume of document images, it is necessary for the image processing devices to process the inputted images according to a more complicated method for control and management than conventional devices so as to recover from troubles in various modes.

Specifically, the above publication (Tokukaihei 2-66586) only mentions improvement of the operation efficiency achieved by comparing the number of copy sheets with the number of documents when recovering from a jam. However, it does not mention a method, for managing inputted images, which allows the image processing device to cope with troubles when it receives images from, for example, a facsimile machine or a personal computer. Thus, the above image processing device still takes time to recover from such troubles.

Another problem of the above-mentioned image processing device is as follows. When a transport error in the recirculating automatic document feeder occurs in processing a large volume of documents while reading the following document or when a trouble such as a jam occurs in successively outputting images inputted in a plurality of modes, if recovery from the jam is not accurately carried out in the process of reading the document images or the process of outputting the document images, it may be uncertain how far the image processing has processed, and time-wasting processes of re-reading and re-processing the images may be required. Therefore, the conventional method for managing the inputted image does not satisfactorily improve the operation efficiency of the image processing device.

Furthermore, a control section executing the method for the management becomes more complicated than a control section that does not execute such management. Thus, the image processing device requires a processor with higher-performance, an accompanying peripheral circuit, etc. so as to prevent the operation efficiency from decreasing, thereby raising the cost of the product.

SUMMARY OF THE INVENTION

It is an object of the present invention to provide a highly-reliable image processing device capable of properly performing the whole processing, from inputting image data to outputting the image data, and quickly and appropriately recovering from various troubles such as a scanner trouble, a transport jam and a printer trouble, when inputting and outputting an image for use in a facsimile machine or in a personal computer, as well as a normal transport jam, while minimizing the increase in the cost of the device.

In order to achieve the above object, an image processing device of the present invention is characterized in including: (1) image data input means for inputting image data; (2) image data storage means for storing the image data; (3) image data confirmation means for confirming characteristics of the image data; and (4) management table means for managing the characteristics of each image data confirmed by the image data confirmation means as management information of image data, with reference to the corresponding image data stored in the image data storage means.

With this arrangement, since the image data is processed according to its management information managed in the management table, it is possible to manage the image processing so that appropriate image processing is applied to each inputted image data, and that time-wasting image processing is not applied to image data improperly inputted.

In addition, if the input of images is interrupted by a trouble, for example, it is possible to perform the instructed image processing with respect to the image data of images which have been completely inputted, recognize which image data has not been inputted, and give an instruction to restart the input and the image processing of the remaining images. Thus, image processing with high reliability can be achieved.

Furthermore, the image processing device of the present invention can perform such management when it functions as a printer to output each page of the image data inputted from external devices, and when receiving the image data inputted from external devices such as a facsimile machine and a personal computer.

For a fuller understanding of the nature and advantages of the invention, reference should be made to the ensuing detailed description taken in conjunction with the accompanying drawings.

BRIEF DESCRIPTION OF THE DRAWINGS

FIG. 4 is an explanatory view showing an example of a management table for managing information relating to images inputted to the digital copying machine of FIG. 1.

FIG. 5(a) is an explanatory view showing a state, before an image is inputted, of an image input table for managing inputted images in the digital copying machine of FIG. 1.

FIG. 5(b) is an explanatory view showing a state, when an image is being inputted, of the image input table for managing inputted images in the digital copying machine of FIG. 1.

FIG. 5(c) is an explanatory view showing a state, after images are inputted, of the image input table for managing inputted images in the digital copying machine of FIG. 1.

FIG. 6(a) is an explanatory view showing a state, before image processing is performed, of an image process table for managing information relating to image processing applied to an inputted image in the digital copying machine of FIG. 1.

FIG. 6(b) is an explanatory view showing a state, after the image processing is performed, of the image process table for managing information relating to image processing applied to an inputted image in the digital copying machine of FIG. 1.

FIG. 7(a) is an explanatory view showing a state, before an image is outputted, of an image output table for managing information relating to image data which has undergone image processing in the digital copying machine of FIG. 1.

FIG. 7(b) is an explanatory view showing a state, when an image is being outputted, of the image output table for managing information relating to image data which has undergone image processing in the digital copying machine of FIG. 1.

FIG. 7(c) is an explanatory view showing a state, after images are outputted, of the image output table for managing information relating to image data which has undergone image processing in the digital copying machine of FIG. 1.

FIG. 8(a) is an explanatory view showing a state, before an image is inputted, of the image input table for managing inputted images in the digital copying machine of FIG. 1.

FIG. 8(b) is an explanatory view showing a state, when an image is being inputted, of the image input table for managing inputted images in the digital copying machine of FIG. 1.

FIG. 8(c) is an explanatory view showing a state, after images are inputted, of the image input table for managing inputted images in the digital copying machine of FIG. 1.

FIG. 9(a) is an explanatory view showing a state, before image processing is performed, of the image process table for managing information relating to image processing applied to an inputted image in the digital copying machine of FIG. 1.

FIG. 9(b) is an explanatory view showing a state, after the image processing is performed, of the image process table for managing information relating to image processing applied to an inputted image in the digital copying machine of FIG. 1.

FIG. 10(a) is an explanatory view showing a state, before an image is outputted, of the image output table for managing information relating to image data which has undergone image processing in the digital copying machine of FIG. 1.

FIG. 10(b) is an explanatory view showing a state, when an image is being outputted, of the image output table for managing information relating to image data which has undergone image processing in the digital copying machine of FIG. 1.

FIG. 10(c) is an explanatory view showing a state, after images are outputted, of the image output table for managing information relating to image data which has undergone image processing in the digital copying machine of FIG. 1.

FIG. 11(a) is an explanatory view showing a state in a fax mode, before an image is inputted, of the image input table for managing an inputted image in the digital copying machine of FIG. 1.

FIG. 11(b) is an explanatory view showing a state in the fax mode, when an image is being inputted, of the image input table for managing inputted images in the digital copying machine of FIG. 1.

FIG. 11(c) is an explanatory view showing a state in the fax mode, after images are inputted, of the image input table for managing inputted images in the digital copying machine of FIG. 1.

FIG. 12(a) is an explanatory view showing a state, before image processing is performed, of the image process table for managing information relating to image processing applied to an inputted image in the digital copying machine of FIG. 1.

FIG. 12(*b*) is an explanatory view showing a state, after the image processing is performed, of the image process table for managing information relating to image processing applied to an inputted image in the digital copying machine of FIG. 1.

FIG. 13(*a*) is an explanatory view showing a state, before an image is outputted, of the image output table for managing information relating to image data which has undergone image processing in the digital copying machine of FIG. 1.

FIG. 13(*b*) is an explanatory view showing a state, when an image is being outputted, of the image output table for managing information relating to image data which has undergone image processing in the digital copying machine of FIG. 1.

FIG. 13(*c*) is an explanatory view showing a state, after images are outputted, of the image output table for managing information relating to image data which has undergone image processing in the digital copying machine of FIG. 1.

DESCRIPTION OF THE EMBODIMENTS

Figure 1:
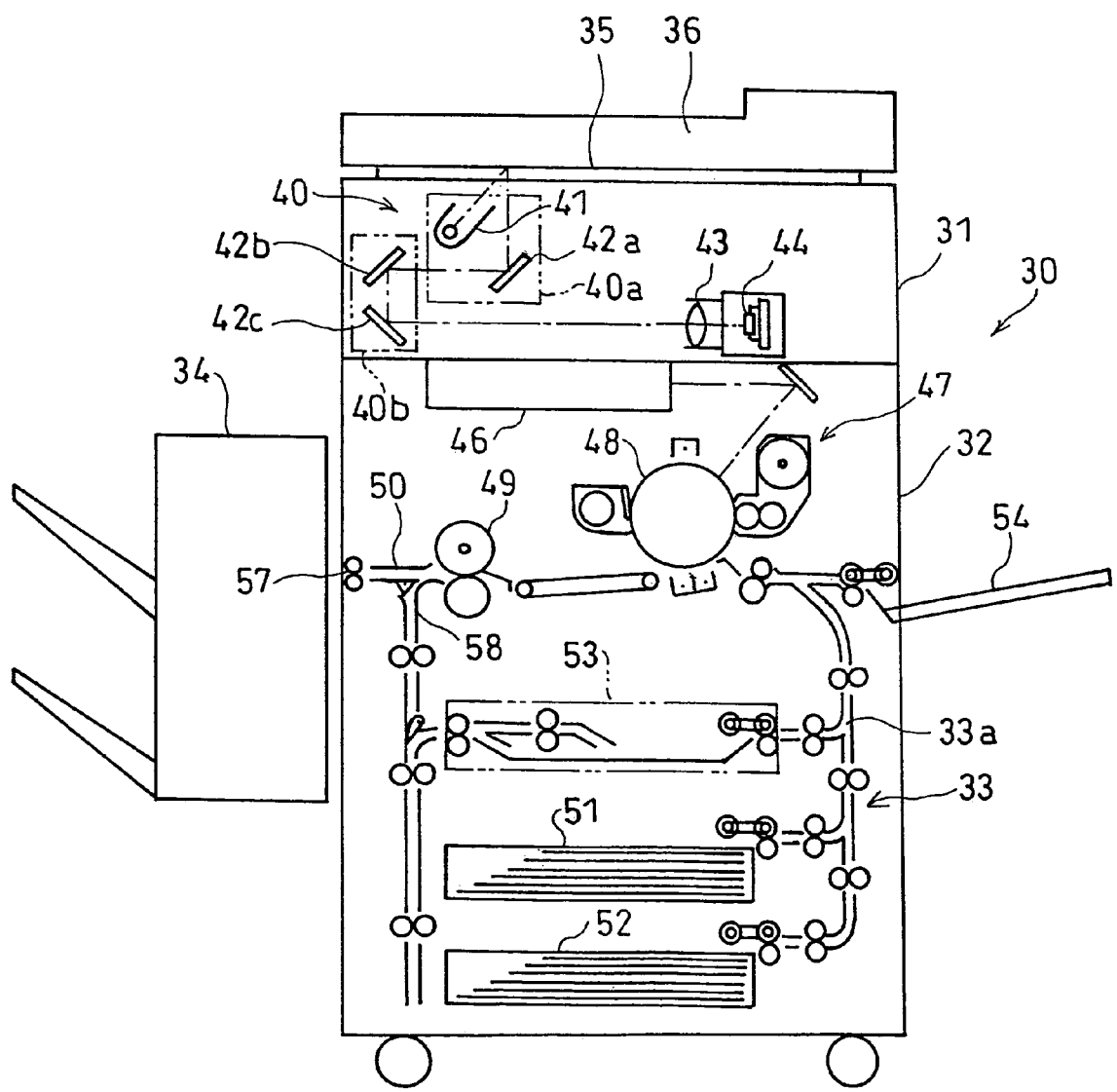
FIG. 1 is an explanatory view schematically showing a structure of a digital copying machine according to one embodiment of the present invention.

Referring to the drawings, the following descriptions will explain one embodiment of an image processing device of the present invention. Here, the image processing device of the present invention is a digital copying machine.

Although this embodiment only deals with the case where the present invention is applied to a digital copying machine, application of the present invention is not limited to a digital copying machine. Specifically, the present invention can be applied to an image processing device for performing image processing with respect to image data inputted from a document image reading apparatus, etc., and an image processing device which further converts the image data so as to have a desired image expression and outputs the resulting image data. Namely, the present invention can be applied to any image processing device requiring, for each inputted image, management of contents of image processing and management of image data which has undergone the image processing.

First, the digital copying machine described in the present embodiment has, for example, a copy mode, a printer mode, a fax mode, etc. FIG. 1 is an explanatory view schematically showing the digital copying machine. With reference to FIG. 1, the entire structure of the digital copying machine will be explained.

A digital copying machine 30 is mainly composed of a scanner section 31, and a laser recording section (image output means) 32.

The scanner section 31 includes a document platen 35 made of transparent glass, an automatic document feeder (ADF) 36 for automatically feeding a document onto the document platen 35, and a document image reading unit, i.e., a scanner unit (image data input means, document image reading means) 40 for reading an image on the document placed on the document platen 35 by scanning.

The document image read by the scanner unit 40 of the scanner section 31 is sent as image data to a main-image processing board and a sub-image processing board, to be described later, and undergoes a predetermined image process.

The ADF 36 is a device in which a plurality of documents are set on a provided document tray (not shown) at a time, and the set documents are automatically fed sheet by sheet to the document platen 35 of the scanner unit 40.

The ADF 36 includes, though not shown, a transport path for single-sided documents, a transport path for double-sided documents, transport-path switching means, a sensor group for recognizing and controlling a state of the document being passed through each section, a control section, etc., so that one side or both sides of documents is/are read by the scanner unit 40 according to a selection made by an operator. As to the ADF 36, many applications have been filed, and there are a variety of ADFs available on the market, and thus further explanations thereof are omitted here.

The scanner unit 40 for reading an image on the document placed on the document platen 35 includes a lamp reflector assembly 41 for the exposure of the surface of the document, a first scanning mirror unit 40*a*, a second scanning mirror unit 40*b*, an optical lens 43, and a photoelectric transfer element (CCD) 44. The first scanning mirror unit 40*a* has a first scanning mirror 42*a* for reflecting light reflected from the document, for guiding the reflected light image from the document to the CCD 44. The second scanning mirror unit 40*b* has a second reflecting mirror 42*b* and a third reflecting mirror 42*c* for guiding the reflected light image from the first scanning mirror unit 40*a* to the CCD 44. The optical lens 43 forms the reflected light image from the document on the CCD 44 through respective reflecting mirrors.

The scanner section 31 successively places documents to be read on the document platen 35 by operations associated with the ADF 36 and the scanner unit 40, and moves the scanner unit 40 along the bottom surface of the document platen 35 so as to read the document image.

In particular, the first scanning mirror unit 40*a* scans at a constant velocity V in a direction along the document platen 35, and the second scanning mirror unit 40*b* is controlled so as to scan in the same and parallel direction at a velocity of V/2.

Thus, the document image is read by sequentially forming an image of the document placed on the document platen 35 line by line on the CCD 44.

The read image data resulting from reading the document image by the scanner unit 40 are sent to the main-image processing board and the sub-image processing board, to be described later, and temporarily stored in a memory of the main-image processing board and a memory of the sub-image processing board after various image processes. Then, the image in the memory is read out in response to an output instruction, and transferred to the laser recording section 32 to form an image on a recording sheet.

The laser recording section 32 includes a transport system 33 for transporting a sheet P as a recording material for forming an image, a laser writing unit 46 (shown as LSU 46 in FIG. 2), and an electrophotographic processing section 47 for forming an image.

The laser writing unit 46 includes a semiconductor laser source (not shown) for emitting laser light according to the image data read out from the memory after being read by the scanner unit 40 or the image data transferred from an external device, a polygon mirror (not shown) for deflecting the laser light at a constant angular velocity, and an f·θ lens (not shown) for correcting the laser light deflected at a constant angular velocity by the polygon mirror so that it is deflected at a constant angular velocity on a photoreceptor drum 48 of the electrophotographic processing section 47.

The electrophotographic processing section 47 further includes a charger, a developing device, a transfer device, a separating device, a cleaning device, and a charge removing device which are placed along the outer surface of the photoreceptor drum 48 in a known manner.

On the other hand, the transport system 33 includes a transport section 33*a* for transporting the sheet P to the electrophotographic processing section 47 for forming an image, particularly to a transfer position where the transfer device is placed, cassette sheet feeders 51 and 52 for feeding the sheet P to the transport section 33a, a manual sheet feeder 54 for feeding a sheet of a desired size as the occasion arises, a fusing device 49 for causing a transferred image, particularly a toner image, to be affixed onto the sheet P, and a retransport path and a double-side copying unit 53 for feeding again the sheet P having the image affixed thereon so as to form an image on the back surface of the sheet P.

Disposed on the downstream side of the fusing device 49 is a post-processing device 34 for receiving the sheet P having an image recorded thereon and for applying a predetermined process to the sheet P with a finisher and a sorter provided therein.

In the laser writing unit 46 and the electrophotographic processing section 47, according to the image data read from an image memory, an electrostatic latent image is formed on the surface of the photoreceptor drum 48 by scanning the photoreceptor drum 48 with a laser beam emitted from the laser writing unit 46. The electrostatic latent image is visualized by toner on the surface of the photoreceptor drum 48, and the resulting toner image is electrostatically transferred and fixed onto the sheet P being fed from either of the cassette sheet feeders 51 and 52 arranged on different levels.

The sheet P having an image formed thereon in this manner is fed into the post-processing device 34 from the fusing device 49 through sheet discharge rollers 57.

Circuit of the Image Processing Section

Next, the following description will explain the structure and the functions of the image processing section, provided in this digital copying machine 30, for performing image processing with respect to read document image data.

Figure 2:
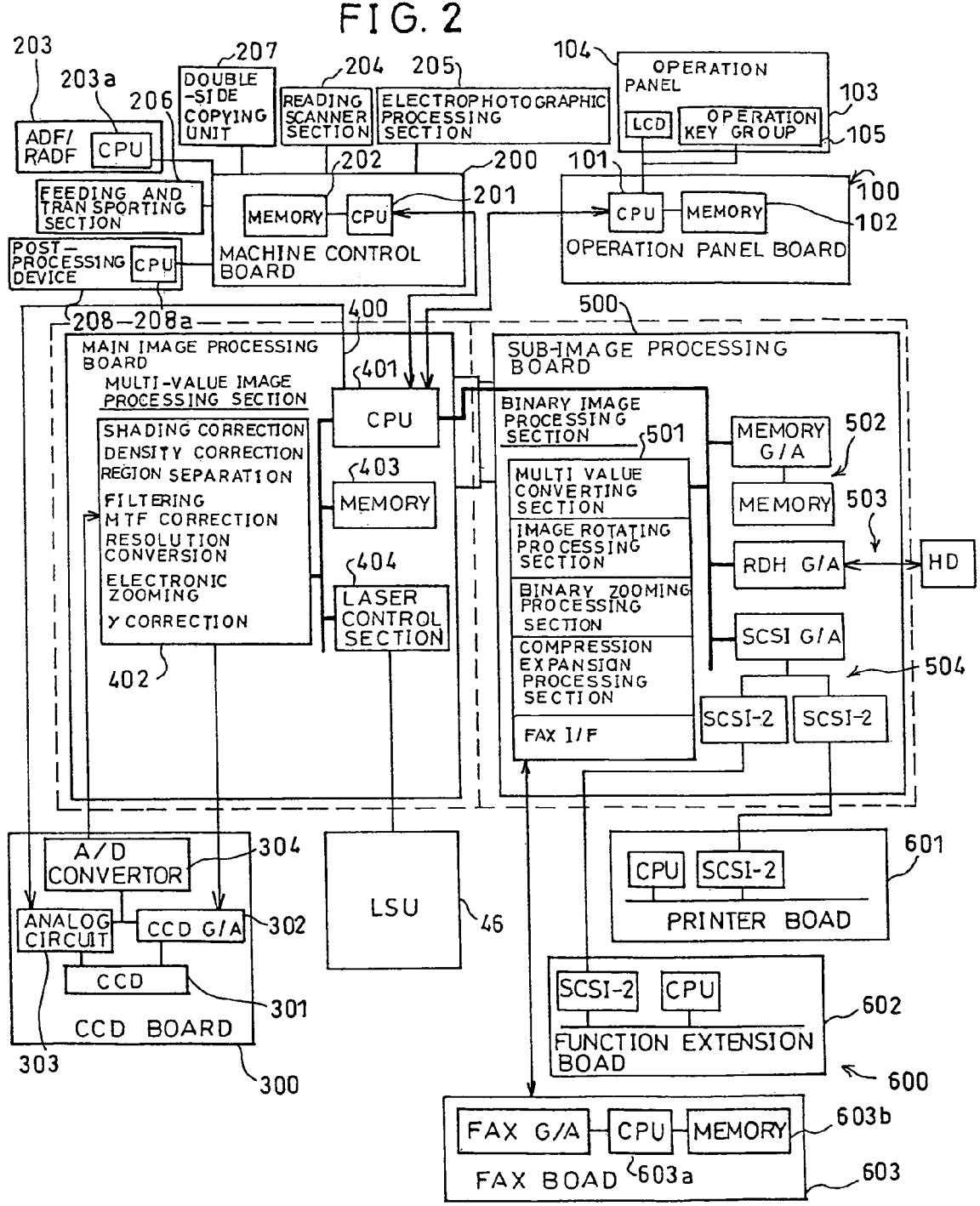
FIG. 2 is a block diagram illustrating a circuit structure of an image processing section and an entire structure of a control section of the digital copying machine shown in FIG. 1.

FIG. 2 is a block diagram showing the entire arrangement of various unit sections and the image processing section that constitute the digital copying machine 30 of FIG. 1. FIG. 2 also shows that a main-central processing unit (hereinafter referred to as a main-CPU) (management table means, mode management section, first management processing section, second management processing section, management output section) 401 and sub-central processing units (hereinafter referred to as sub-CPUs; to be described later) are connected to each other and control the operation of the digital copying machine 30. The sub-CPU is provided for each unit section.

As shown in the block diagram, the circuit of the digital copying machine 30 includes an operation panel board 100, a machine control board (image data confirmation means) 200, a CCD board 300, a main-image processing board 400, a sub-image processing board 500, and an expansion board group 600 (a printer board 601, a function expansion board 602, a facsimile board 603 (facsimile interface means)). The operation panel board 100 manages and controls an operation panel. The machine control board 200 manages and controls the respective units constituting the digital copying machine 30. The CCD board 300 consists of a CCD 301 (44) for electrically reading the document image to produce electronic data. The main-image processing board 400 performs predetermined image processing with respect to the document image in the form of electronic data produced by the CCD board 300. The sub-image processing board 500 further performs predetermined image processing on the image data processed in the main-image processing board 400. The expansion board group 600 is connected to the sub-image processing board 500 through interfaces. Here, the expression "CCD 301 (44)" indicates that the CCD 301 of FIG. 2 corresponds to the CCD 44 of FIG. 1. Numerals in parentheses in the description below are also provided to express such a relationship.

The following description explains how each board is controlled.

Operation Panel Board

The operation panel board 100 is basically controlled by the sub-CPU 101. Specifically, the sub-CPU 101 controls a display screen of an LCD display section 104 disposed on an operation panel 103 and an operation inputted through an operation key group (mode setting means) 105 for inputting instructions relating to various modes.

The operation panel board 100 is further provided with a memory 102 for storing data inputted through the operation key group 105 and various control information relating to the operation panel, for example, information to be displayed on the LCD screen.

In this arrangement, the sub-CPU 101 communicates control data with the main-CPU 401 and gives instructions to operate the digital copying machine 30.

The main-CPU 401 transmits control signals indicating the operation state of the digital copying machine 30 to the sub-CPU 101, thereby showing the operator the current operation state of the device through the LCD display section 104 of the operation panel 103.

Machine Control Board

The machine control board 200 is entirely controlled by a sub-CPU 201. The machine control board 200 controls an automatic document feeder 203 (36; hereinafter referred to as an ADF), a reading scanner section 204 (31) for reading a document image, an electrophotographic process section 205 (48) for reproducing an original image according to image data, a feeding and transporting section 206 (33), a double-side copying unit 207 (53) and a post-processing device 208 (34). A recirculating automatic document feeder (RADF) may be used as the ADF 203 (36). The feeding and transporting section 206 (33) sequentially transports a sheet on which an image is to be formed from a storage section to the electrophotographic process section 205 (48). The double-side copying unit 207 (53) turns upside down a sheet on which an image has been recorded, and transports the sheet to form images on both sides of the sheet. The post-processing device 208 (34) performs post-processing such as stapling with respect to the sheets having images recorded thereon.

CCD Board

The CCD board 300 includes a CCD 301 (44) for electrically reading a document image, a circuit 302 (CCD gate array) for driving the CCD 301 (44), an analog circuit 303 for performing adjustment of the gain of analog data to be outputted from the CCD 301 (44), and an A/D converter 304 for converting an analog output of the CCD 301 (44) to a digital signal and outputting the digital signal as electronic data. The CCD board 300 is controlled and managed by the main-CPU 401.

Main-Image Processing Board

The main-image processing board 400 which is controlled by the main-CPU 401 includes a multi-value image processing section (image processing means) 402, an image memory (image data storage means) 403, and a laser control section 404. The multi-value image processing section 402 performs various processes with respect to multi-value image data according to electronic data of a document image sent from the CCD board 300, so that the gradation of the original image is expressed in a desired manner. Specifically, the multi-value image processing section 402 performs shading correction, density correction, region separation, filtering, MTF correction, resolution conversion, electronic zoom (scaling process), and gamma correction. The image memory 403 stores image data having been processed and control information such as information for managing the sequence of the processes. The laser control section 404 controls data transfer to the laser writing unit 46 so that an original image is reproduced according to processed image data.

Sub-Image Processing Board

The sub-image processing board 500 includes a binary image processing section (image processing means) 501, an image memory 502 (second image data storing means), a hard disk device 503, a SCSI interface 504, etc. The image memory 502 is composed of a memory and a gate array which controls the memory, and provided for storing and managing binary image data resulting from image processing and control information of processes. The hard disk device 503 is composed of a hard disk and a gate array which controls the hard disk, and provided for storing and managing image data of a plurality of documents so that a plurality of copies are produced by reading out the document images from the hard disk for a desired number of times. The SCSI interface 504 is composed of a SCSI, as an external interface, and a gate array which controls the SCSI. The above-mentioned binary image processing section 501, the image memory 502, the hard disk device 503, and the SCSI interface 504 are connected to the main-image processing board 400 and controlled by the main-CPU 401.

In addition, the binary image processing section 501 includes a multi-to-binary conversion section for converting multi-value image data into a binary image, an image rotation section for rotating an image, binary-image scaling (zooming) section for scaling up and down a binary image, and a compression-and-expansion section. The binary image processing section 501 further includes a facsimile interface section for transmitting and receiving a facsimile image (an image for use in a facsimile machine) through communications means.

Expansion Board

The expansion board group 600 is constituted by the printer board 601, the function expansion board (interface means) 602, the facsimile board 603, etc. The printer board 601 is provided for permitting data from, for example, a personal computer to be outputted from a printer section of the digital copying machine in a printer mode. The function expansion board 602 is a general interface that enables the digital copying machine to transmit/receive image data to/from various peripheral devices, including a personal computer, which are connected to the digital copying machine. The function expansion board 602 also enables the expansion of the editing functions of the digital copying machine, thereby making an effective use of the characteristics of the digital copying machine. The facsimile board 603 is provided for sending, to a receiver, a document image read through the scanner section of the digital copying machine, and for outputting, from the printer section of the digital copying machine, image data sent from a sender.

The following description will explain in detail image data processing and flow of image data when the digital copying machine as an image processing device carries out a copy mode, a fax mode, or a printer mode.

Copy Mode

Documents placed at a predetermined position on the ADF 36 (203) of the digital copying machine 30 are sequentially fed sheet by sheet onto the document platen 35 of the scanner unit 40 (204). Images on the documents are read in sequence by the scanner unit 40 (204) having the above arrangement and then transmitted as 8-bit electronic data to the main-image processing board 400.

The 8-bit electronic data transmitted to the main-image processing board 400 undergoes predetermined processes in the multi-value image processing section 402 as 8-bit electronic image data.

After receiving processes such as the gamma correction, the 8-bit electronic image data is sent to the laser writing unit 46 through the laser control section 404.

In this manner, the document image read in the scanner section 31 (204) is outputted from the laser recording section 32 as a copied image with a gradation.

Electronic RDH Function In a Copy Mode

As described above, documents placed at a predetermined position on the ADF 36 (203) of the digital copying machine 30 are sequentially fed sheet by sheet onto the document platen 35 of the scanner unit 40 (204). Images of the documents are read in sequence by the scanner unit 40 (204) with the above arrangement and then transmitted as 8-bit electronic data to the main-image processing board 400.

The 8-bit electronic data transmitted to the main-image processing board 400 undergoes predetermined processes in the multi-value image processing section 402 as 8-bit electronic image data.

The 8-bit electronic data is then sent to the sub-image processing board 500 through a connector 405 of the main-image processing board 400 and a connector 505 of the sub-image processing board 500, subjected to processes such as the error diffusion, and converted into 2-bit electronic image data in the multi-to-binary conversion section of the binary image processing section 501.

Note that processes such as the error diffusion are performed when converting 8-bit electronic image data into 2-bit electronic image data so as to prevent a problem in image quality that may occur when multi-to-binary conversion is simply performed. Namely, processes such as the error diffusion are performed to reduce degradation of the image quality and save storage capacity for storing images.

The 2-bit electronic image data produced by the above conversion is sent to the memory, i.e., the hard disk device 503, etc. and temporarily stored and managed by an amount corresponding to a piece of document.

When all the documents placed on the ADF 36 (203) of the digital copying machine 30 are read, the 2-bit electronic image data temporarily stored in the hard disk device 503 is read out a specified number of times by the control of the gate array. The read-out 2-bit electronic image data is again sent to the main-image processing board 400 through the connectors 405 and 505 connected thereto, subjected to processes such as the gamma correction, and transferred to the laser writing unit 46 through the laser control section 404.

In the above description, after all images on the documents have been read, images are read out a desired number of times. However, the digital copying machine 30 can be arranged so that a sequential output of images is started from the copy of the first document when a predetermined amount of images are read.

In this manner, the document images read in the scanner section 31 (204) of the digital copying machine 30 are outputted from the laser recording section 32 as copied images with gradations.

Printer Mode

An image sent from an external device, such as a personal computer, connected to the digital copying machine 30 by a network is converted in the printer board 601 into an image corresponding to each page (hereinafter referred to as a page image), once transmitted to the sub-image processing board 500 through the SCSI interface 504, and then stored in the memory such as the hard disk device 503.

Note that when the image converted into a page image in the printer board 601 is sent to the sub-image processing board 500, the page image is temporarily stored in the hard disk device 503 without undergoing the binary image processing.

Furthermore, when the page image temporarily stored in the hard disk device 503 is read out, no binary image processing is performed with respect to the page image.

The image data temporarily stored in the hard disk device 503 is read out so as to be arranged in page order, sent to the main-image processing board 400, subjected to the gamma correction, and then controlled by the laser control section 404 so that the image data is written to reproduce the original image in the laser writing unit 46.

Fax Mode

In the fax mode, the digital copying machine 30 sends a document to a receiver and receives a document from a sender.

First, sending a document to a receiver is explained below. Documents to be sent to a receiver are set at a predetermined position of the ADF 36 (203) of the digital copying machine 30. The documents are sequentially fed sheet by sheet onto the document platen 35 of the scanner unit 40 (204), read in sequence by the scanner unit 40 (204) with the above-described arrangement, and then transmitted to the main-image processing board 400 as 8-bit electronic data.

The 8-bit data transmitted to the main-image processing board 400 undergoes predetermined processes in the multi-value image processing section 402 as 8-bit electronic image data.

The 8-bit electronic data is then sent to the sub-image processing board 500 through the connector 405 of the main-image processing board 400 and the connector 505, subjected to processes, such as the error diffusion, and converted into 2-bit electronic image data in the multi-to-binary conversion section of the binary image processing section 501.

Note that processes such as the error diffusion are performed when converting 8-bit electronic image data into 2-bit electronic image data so as to prevent a problem in image quality that may occur when multi-to-binary conversion is simply performed. Namely, processes such as the error diffusion are performed in order to reduce degradation of the image quality.

The documents to be sent are converted into binary images in the above-mentioned manner, and then compressed in a predetermined format, and stored in the image memory 502.

When the digital copying machine 30 completes the procedure for sending documents to a receiver and becomes ready to send the documents, the document images to be sent, which have been read out from the image memory 502 and compressed in a predetermined format, are transmitted to the facsimile board 603, subjected to necessary processes such as changing the format of compression in the facsimile board 603, and then sequentially sent to the receiver through a telecommunication line.

Next, explanations will be made of processing a document image sent from a sender.

When a document is sent from a sender through a telecommunication line, the digital copying machine 30 receives the document image having been sent from the sender while completing the communication procedure in the facsimile board 603. The received image compressed in a predetermined format is transmitted to the binary image processing section 501 through the facsimile interface section provided therein. Then, the document image having been sent is reproduced as a page image in the compression-and-expansion section, etc.

The document image reproduced as the page image is transmitted to the main-image processing board 400, subjected to the gamma correction, and controlled by the laser control section 404 so that the image is written to reproduce the original image in the laser writing unit 46.

As described above, the image processing section for performing a predetermined process with respect to image data is mainly composed of the main-image processing board 400 and the sub-image processing board 500. The main-image processing board 400 processes multi-value image data of a document image read and inputted through the scanner section 31 (204). The sub-image processing board 500 carries out a predetermined process such as a binary-coding process with respect to the document image data processed as the multi-value image data in the main-image processing board 400. The sub-image processing board 500 also performs a predetermined process on image data sent from an external device connected with an interface, and then transmits the resulting image data to the multi-value image processing section (main-image processing board 400).

Furthermore, the main-image processing board 400 includes the laser control section 404 for controlling writing of the image data in the laser writing unit 46 so that the image is reproduced on the photoreceptor drum 48 of the electrophotographic processing section 47 by the laser writing unit 46.

With this structure, the document image read and inputted through the scanner section 31 (204) can be reproduced as a copied image from the laser recording section 32 without impairing characteristics of the image of the document as a multi-value image. Additionally, for example, even when a large volume of documents are required to be processed and outputted at a high speed, the use of the sub-image processing board 500, the hard disk device 503, etc. enables reproduction of the image.

With this arrangement, it is possible to appropriately process the image data from external devices such as a facsimile machine and a printer, and output the processed image. In particular, when receiving image data from a facsimile machine, the digital copying machine 30 can perform suitable processes according to digital functions as the characteristics of the digital copying machine 30 with respect to the image data, for example, a binary-coding process with respect to a received document which has undergone multi-value image processing, i.e., retained the characteristics of the document image.

Moreover, since the image processing section is divided into parts, a variety of the digital copying machine 30 (a lineup of the product) can be supplied. It is thus possible to provide the user with a desired digital copying machine and easily develop the system including the digital copying machine as the user desires.

In addition, since the main-CPU 401 disposed on the main-image processing board 400 controls both the main-image processing board 400 and the sub-image processing board 500, the flow of the image successively processed in the respective image processing sections is entirely controlled. As a result, data and processes flow smoothly, thereby preventing the image data from being lost.

Operation Panel Section

Figure 3:
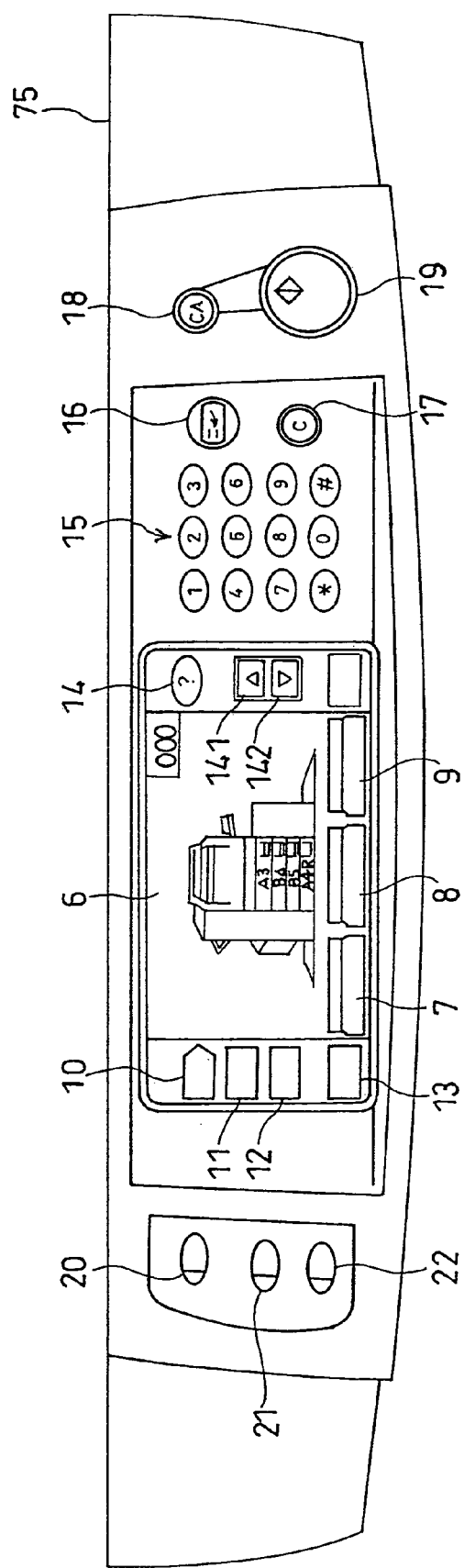
FIG. 3 is a plan view showing an example of an operation panel section provided in the digital copying machine of FIG. 1.

FIG. 3 shows an operation panel 75 (103) of the digital copying machine 30. A touch panel liquid crystal display device 6 (104) is provided in the middle of the operation panel 75 (103), and a various-mode setting key group is provided around the touch panel liquid crystal display device 6 (104).

The touch panel liquid crystal display device 6 (104) usually displays on its screen a basic start screen for selecting various modes. When an area for entering an instruction to select a desired mode is directly pressed with the operator's finger as the occasion arises, the display on the screen of the liquid crystal display device 6 (104) successively changes so as to make it possible to input instructions of selecting various modes.

When the operator touches, with his or her finger, the area where a desired editing function is displayed, the operator can set the editing function.

The following description briefly explains the various-mode setting key group provided on the operation panel 75 (103). An outline view of the digital copying machine is displayed around the center of the liquid crystal display device 6 (104). Provided under the view are a copy-density setting key 7 for setting copy density, a sheet-size setting key 8 for setting a sheet size, and a scaling-factor setting key 9 for setting a scaling factor in scaling up and down image data.

In addition, a special function mode key 10, a double-side copy mode key 11, an output mode key 12, and a setting confirmation key 13 are provided on the operation panel 75 (103). The special function mode key 10 changes the display on the liquid crystal display device 6 (104) into an edit mode setting screen for editing a document image. The double-side copy mode key 11 changes the display on the liquid crystal display device 6 (104) into a setting screen for setting various conditions in a double-side copy mode. The output mode key 12 changes the display on the liquid crystal display device 6 (104) into a screen for setting various conditions in an output mode such as a sorter mode and a staple mode. The setting confirmation key 13 is provided for confirming the contents of currently-set modes.

The operation panel 75 (103) further includes an operation guide key 14, scroll keys 141 and 142, a ten-key numerical pad 15, an interruption key 16, a clear key 17, an all cancellation key 18 and a start key 19. The operation guide key 14 is provided for displaying guidance information such as an operation method on the screen. The scroll keys 141 and 142 are provided for scrolling up and down the guidance information displayed on the liquid crystal display device 6 so that the whole guidance information is displayed and confirmed. The ten-key numerical pad 15 is provided for inputting numerical information such as the number of copies. The interruption key 16 is provided for interrupting a currently-processing copy mode by a new copy mode and continuing the processing in the new mode. The clear key 17 is provided so that settings inputted through, for example, the ten-key numerical pad 15 are cleared. The all cancellation key 18 is provided so that the state of the digital copying machine 30 is all cleared and reset to the normal state. The start key 19 is provided for making instructions of starting the processing in the mode set by the above keys.

Three keys arranged on the left side of the operation panel 75 are, from the top, a fax mode key 20, a printer mode key 21, and a copy mode key 22. The fax mode key 20, the printer mode key 21, and the copy mode key 22 are provided for operating the digital copying machine 30 in the fax mode, the printer mode, and the copy mode, respectively.

Note that the above-mentioned various keys of the operation panel 75 (103) are shown as an operation key group 105 in FIG. 2.

The above-mentioned operation panel and various keys placed thereon are merely examples for explaining one embodiment of the present invention. Therefore, needless to say, the keys on the operation panel may vary depending on various functions built in the digital copying machine.

FIG. 4 shows a management table 700 for managing information relating to image data for each inputted image data. The management table 700 is constituted by three tables, i.e., an image input table 701, an image process table 710, and an image output table 720.

The management table 700 to be explained in the present embodiment is produced in such a manner that each image has one management table 700. Information relating to the characteristic of an inputted image and information relating to processing of the image are set and managed in the management table 700.

The three tables constituting the management table 700 are explained below.

Image Input Table

The image input table 701 manages information relating to image data and processing conditions, for each image data inputted through the scanner section 204 (31), the facsimile board 603, the printer board 601, etc.

With reference to FIG. 4, the following description will explain the image input table 701 in detail. In the image input table 701, there are, from the left to the right, columns for managing document ID information 702, document side information 703, document size information 704, scaling factor information 705, read image number information 706, input request information 707, and input completion information 708, respectively.

The document ID information 702 is an identification number for identifying each page of inputted document images or received images. The document side information 703 indicates whether the inputted image is formed on the front side (surface) or the back side (surface) of the document.

The document size information 704 relates to the size of the inputted image data. The scaling factor information 705 is information relating to change in a scaling factor when scaling up and down the inputted image data.

The read image number information 706 indicates how many images are inputted as the image data of one page through an input section such as the scanner section 204 (31). The input request information 707 shows whether sections for processing the image data have been ready to perform predetermined processing with respect to the image data and given a request for transmitting the image data. Here, the sections for processing the image data are, for example, the image processing section constituted by the main-image processing board 400 and the sub-image processing board 500, and the image recording section constituted by the laser writing unit 46, etc. The input completion information 708 shows whether image data of one page is completely inputted from the image input section (whether the image data is stored in the image memories 403 and 502).

Image Process Table

The image process table 710 manages, for each image data, contents of image processing to be performed with respect to the image data and information relating to the image data which has undergone the image processing.

Referring to FIG. 4, the following description will explain in detail the image process table 710. In the image process table 710, there are, from the left to the right, columns for managing image ID information 711, process information 712, process ID information 713, and process completion information 714, respectively.

The image ID information 711 is an identification number for identifying each page of inputted document images. The process information 712 shows the contents of processing to be performed with respect to inputted image data for each page.

The process ID information 713 is information showing a location (an address, etc.) in the image memories 403 and 502, where the image data processed in accordance with the process information 712 and converted into output image data of one page is stored. The process completion information 714 shows whether the image processing instructed to be performed on the inputted image data is completed or not.

Image Output Table

The image output table 720 manages, for each page, information relating to an output of image data which has been processed.

With reference to FIG. 4, the following description will explain the image output table 720 in detail. In the image output table 720, there are, from the left to the right, columns for managing output image ID information 721, sheet side information 722, print size information 723, print number information 724, output request information 725, output completion information 726, memory release information 727, and output ID information 728, respectively.

The output image ID information 721 is an identification number for identifying each page of the image data having been processed. The sheet side information 722 indicates whether the image is to be recorded on the front side (surface) or the back side (surface) of the sheet. The print size information 723 shows the size of the image to be recorded (sheet size).

The print number information 724 is the number of the image data to be outputted. The output request information 725 shows whether the image data is requested by the output section.

The output completion information 726 indicates whether the image data after undergoing the image processing is outputted as instructed. The memory release information 727 shows that the image memory is permitted to be released after the output of the image data has been completed. The output ID information 728 is information indicating a location such as an address in the image memory, where the final image to be printed is stored and managed.

The respective management tables 701, 710 and 720 that constitute the management table 700 are explained in detail above.

Note that other items of information required for a processing system can be freely and easily added to the various items of information managed in the above-mentioned management table 700. Namely, in accordance with the specifications of the image processing device, the above-described image input information, image processing information, and the image output information can be omitted, or other items of information than those information can be added.

Furthermore, as the optimum embodiment of the management table 700, the management table 700 is stored in the image memory 403 such as a RAM (random access memory) controlled by the CPU 401, by the CPU 401 that controls the image processing section (ICU: image control unit) including the main-image processing board 400 and the sub-image processing board 500 of the digital copying machine 30. However, needless to say, other arrangements are possible, considering the circuit arrangement in the image processing device, space for the device, and wiring, etc. Namely, it is possible to arrange the management table 700, for example, on the machine control board 200, or outside the main body of the device, like external memory devices including various memory cards, and servers and external controllers that are connected to the device by a network.

Management information which is managed by the management table 700 will be explained by presenting an example below.

Three Documents in A4-Size: Two Copies

For example, when three documents in A4-size are placed on a document tray of the ADF 203 (36), the image input table 701 for managing an input of image data manages various items of information as shown in FIG. 5(a).

Since the number of the documents is not recognized at this time, the document ID information 702 is set to "1". The document size is set to "A4", which has been confirmed by document size detecting means. The scaling factor is set to "100%" according to the setting through the scaling-factor setting key 9 on the operation panel 103 (75). The read image number is set to "1" indicating that the document image is read and stored in the image memories 403 and 502. All the confirmed information mentioned above is now managed in the image input table 701.

Then, an input of the image is started according to a request for inputting the document image. Every time the presence of another document is confirmed, the management table for managing the new document image is produced, and the document ID information is set for each document image.

The state at this time is shown in FIG. 5(b) indicating that information relating to each of three inputted document images is managed.

When an input of three document images is completed, as shown in FIG. 5(c), the input completion information 708 for all of the three document images is set to "1", thereby indicating that the document image data is inputted. Thus, it is confirmed that all of the document images are inputted.

Meanwhile, in the image processing section, the image process table 710 for managing the information relating to the processing with respect to the document image is produced as shown in FIG. 6(a). In the image process table 710, information relating to the image processing for each inputted image data is managed.

Since no editorial instruction to perform special image processing is inputted through the operation panel 103 (75), the process information 712 is set "through" for each document image.

Namely, the document image data read and inputted through the scanner section 204 (31) is subjected to normal multi-value image processing, and the resulting multi-value image data is simply outputted as a copied image of the document from the laser recording section 46.

When the normal image processing (multi-value image processing) is performed with respect to the inputted document image data and the image-processed image data is prepared in the image memories 403 and 502, the process ID information 713, as information showing a location (address) where the image data is stored in the image memories 403 and 502, is set to "1", and the process completion information 714 is set to "1" indicating completion of the processing.

When the normal image processing (multi-value image processing) is completed with respect to the inputted image data of three documents, as shown in FIG. 6(b), the process ID information 713 is set to "2" and "3", thereby indicating the location (address) of the image data of the second and third documents, respectively, stored and managed in the image memories 403 and 502. The process completion information 714 is set to "1" for each image data.

Namely, it is confirmed by the process completion information 714 whether the instructed image processing has been performed with respect to each inputted image data. In addition, the location where each image data is stored in the image memories 403 and 502 is confirmed by the process ID information 713.

Thereafter, in the image processing section, the image output table 720 for managing the output of the image is produced as shown in FIG. 7(a) so as to finally output the reproduced image data completed as described above from the laser recording section 32.

In order to output, from the laser recording section 32, the image data having been processed in accordance with the information relating to the image processing managed in the above image process table 710, a management table for each image to be outputted is also produced in the image output table 720.

First, as shown in FIG. 7(a), the output image ID information 721 is set for each image to be outputted, and various output conditions such as the print side (double or single), print size, and print number, inputted through the operation panel 103 (75), are respectively set, thereby preparing for the output.

Next, when the laser recording section 32 is prepared for outputting the image data and an instruction signal from the laser recording section 32 for an output request is confirmed, as shown in FIG. 7(b), the output request information 725 is set to "1", thereby indicating that the output request has been received. Then, the image data is successively outputted according to the instructed output conditions.

The output of the image data is performed based on the output ID information 728. The output ID information 728 corresponds to the location information (process ID) of the image data stored in the image memories 403 and 502, which is managed in the image process table 710, and corresponds to the sequence of outputting the images, which is determined by the instructed output conditions. Namely, the three images identified as "1", "2", and "3", respectively, by the output ID information 728 are outputted in this order.

When the output of the image data is completed, the memory release information 727 for releasing the image memories 403 and 502, i.e., permitting an instruction to clear the image data from the image memory, is set.

Finally, FIG. 7(c) shows the image output table 720 after every image data stored in the image memories 403 and 502 is outputted as an output image.

Note that since the number of copies to be outputted is "1" in the above example, the memory release information 727 for permitting clearance of the image from the image memories 403 and 502 is set when completion of the output of the image is confirmed. However, in the case where information indicating a plurality of copies, for example, three copies to be outputted is set as the print number information 724, the memory release information 727 for permitting clearance of the image data is set after the image data stored in the image memories 403 and 502 is read out three times in the order of the output ID information 728, i.e., in the order of "1", "2" and "3".

Next, the following description will explain how management is performed by using the management table when a "composite mode" is set as an image editing mode.

Explanation of the image input table 701 for managing inputted image data will be made in the same manner as FIGS. 5(a) to 5(c). Namely, when three documents in A4-size are set on the ADF 203 (36) and images are successively inputted through the scanner section 204 (31), the image input table 701 is produced as shown in FIGS. 8(a) to 8(c), which is the same as the image input table 701 shown in FIGS. 5(a) to 5(c). The procedure of producing the image input table 701 of FIGS. 8(a) to 8(c) is completely the same as the image input table 701 of FIGS. 5(a) to 5(c), and thus explanation thereof is omitted here.

Next, as shown in FIG. 9(a), the image process table 710 is produced according to the mode instructed through the operation panel 103 (75). For example, in the case where a composite image of the first and second documents is formed, the composite image is outputted and a copy of the third document is outputted as it is, the image process table 710 to be explained below is produced.

The images of the first, second and third documents are identified as "1", "2" and "3" by the image ID information 711, and hereinafter referred to as the first image, second image and third image, respectively. The process information 712 of the first image is set to "composition with 2" which is the information showing that the first and the second images are to be formed into one composite image. The process information 712 of the second image is set to "composition with 1" which is the information showing that the second and the first images are to be formed into one composite image.

The process information 712 of the third image is set to "through" which is the information showing that the third document image is to be outputted as it is after undergoing the normal multi-value image processing.

Next, image processing (editing) is performed with respect to each image data according to the process information 712.

In this mode, the first and second images are to be formed into one composite image. Specifically, the first and second images are processed to produce one composite image at a new location in the image memories 403 and 502. In the image process table 710, as shown in FIG. 9(*b*), the process ID information 713 of each of the first and second images is set to "4" showing the location of the composite image in the image memories 403 and 502.

Next, in order to output, from the laser recording section 32, the image data having been processed in accordance with the information which relates to the image processing and is managed in the image process table 710, a management table for each image to be outputted is also produced in the image output table 720.

First, as shown in FIG. 10(*a*), the output image ID information 721 is set for each image to be outputted, and various output conditions such as the print side (double or single), print size, and print number, inputted through the operation panel 103 (75), are respectively set, thereby preparing for the output.

Next, when the laser recording section 32 is prepared for outputting the image data and an instruction signal from the laser recording section 32 for an output request is confirmed, as shown in FIG. 10(*b*), the signal indicating that the output request has been received is set as the output request information 725. Then, the image data is successively outputted according to the instructed output conditions.

The output of the image data is performed based on the output ID information 728. The output ID information 728 corresponds to the location information (process ID) of the image data stored in the image memories 403 and 502, which is managed in the image process table 710, and corresponds to the sequence of outputting the images, which is determined by the instructed output conditions. The two images identified as "4" and "3", respectively, by the output ID information 728 are outputted in this order.

When the output of the image data is completed, the memory release information 727 is set to "1" as shown in FIG. 10(*c*), thereby enabling the release of the image memories 403 and 502, i.e., enabling an instruction to clear the image data from the image memories 403 and 502.

Management tables to be produced when the digital copying machine 30 of the present invention sends a facsimile are explained below.

As described above, documents set on the ADF 203 (36) are sequentially fed, and images of the documents are read by the scanner section 204 (31). Then, the image input table 701 is produced as shown in FIGS. 11(*a*) to 11(*c*), which is the same as the image input table 701 shown in FIGS. 5(*a*) to 5(*c*) or FIGS. 8(*a*) to 8(*c*).

Next, in order to convert the inputted document image into a facsimile image to be sent, the process information 712 of each of the first, second and third images is set to "binary-coding" in the image process table 710 as shown in FIG. 12(*a*).

When the binary-coding processing is performed with respect to the inputted document image data in accordance with the process information 712 shown in FIG. 12(*a*), each of the resulting binary images is formed and stored at a new location in the image memories 403 and 502. Specifically, when the binary-coding processing is completed, the process ID information 713 of each of the first, second and third images is set to "4", "5" and "6", respectively as shown in FIG. 12(*b*), thereby indicating the locations of the respective binary images stored in the image memories 403 and 502.

Finally, the image output table 720 is produced so as to output the image data stored in the image memories 403 and 502 by facsimile transmission. In the image output table 720, the output image ID information 721 is set so that the images are outputted in a desired order (FIG. 13(*a*)). When the preparation for sending the facsimile is completed and a signal for an output request is confirmed, the information indicating that the output request has been received is set as the output request information 725 as shown in FIG. 13(*b*). Then, the digital copying machine 30 communicates with the facsimile machine, and outputs the image.

When it is confirmed that all the images are transmitted, information enabling the image data to be cleared is set as the memory release information 727.

As explained so far, management is performed by using the above management tables when images are transmitted in the copy mode or in the fax mode. Such management is also applicable to the printer mode where each page of the image inputted from an external device is outputted. In this case, it is possible to manage the whole processing, from the input of the image to the output thereof, by producing, for each image data inputted page by page, the image input table 701, the image process table 702, the image output table 703, etc.

Furthermore, this embodiment deals with image processing in normal modes such as the copy mode, the image composition mode, and the fax mode. However, the image processing mentioned in the present invention is not limited to those modes, and can be applied to image processing in various modes such as enlarging and reducing mode, image connecting mode, masking/trimming mode, and a rotating mode.

An image processing device of the present invention, including:

(1) image data input means for inputting image data;

(2) mode setting means for setting a processing mode of the inputted image data;

(3) image data confirmation means for confirming characteristics of the inputted image data; and (4) image processing means for performing image processing with respect to the image data inputted through the image data input means, according to a processing mode set by the mode setting means, may be arranged to include:

(5) management table means for managing (i) a processing mode set by the mode setting means, and (ii) the characteristics of each image data confirmed by the image data confirmation means, as management information of image data inputted through the image data input means;

(6) image data storage means for storing the inputted image data;

(7) image processing means for (i) managing each image data stored in the image data storage means and the management information of the image data managed by the management table means, with reference to each other, and (ii) performing image processing with respect to each image data inputted through the image data input means according to the management information of the image data managed by the management table means; and (8) image data management table means for managing information of each image processed by the image processing means. The management table means can also function as the image data management table means.

With this arrangement, since the image data is processed according to its management information managed in the management table, it is possible to manage the image processing so that appropriate image processing is applied to each inputted image data, and that time-wasting image processing is not applied to image data improperly inputted.

In addition, if the input of images is interrupted by a trouble, for example, it is possible to perform the instructed image processing up to image data which has just been completely inputted as a whole image, and to recognize image data which has not been inputted so as to give an instruction to restart the input and the image processing of the remaining images. Thus, image processing with high reliability can be achieved.

Furthermore, the image processing device of the present invention can perform such management when outputting, with its printer function, each page of the image data inputted from external devices, and when processing the image data inputted from external devices such as a facsimile machine and a personal computer.

The image processing device of the present invention may also be arranged so that the image data is image data of a document image, and that the image data input means is the document image reading means for reading the document image.

With this arrangement, the above management method can be adopted in apparatuses having an image reading section, for example, a digital copying machine.

The image processing device of the present invention may also be arranged to further include second image data storage means for storing the processed image, and to manage the image data stored in the second image data storage means and the information managed by the management table means, with reference to each other.

With this arrangement, even when a plurality of images are inputted or when images are inputted through a plurality of image input systems of a multi-functional digital copying machine having, for example, a fax mode and a printer mode, management can be performed so that appropriate image processing is applied to each image data, based on the stored image data.

The image processing device of the present invention may further include image output means for outputting an image so that the image is processed in accordance with the information managed by the management table means and outputted through the image output means.

With this structure, even when a plurality of image data are inputted, it is possible to perform appropriate image processing with respect to each inputted image data, and to manage the output of each image data.

Namely, the image processing device of the present invention creates a new management table for managing the information of an image which has undergone image processing according to management information in another management table, and then outputs the image according to the information in the created management table. With this arrangement, even when a plurality of images are inputted or when images are inputted through a plurality of image input systems of a multi-functional digital copying machine, it is possible to perform appropriate image processing with respect to the inputted image data, and to manage the output of the processed image data for each input system. As a result, it is possible to certainly manage the whole image processing, i.e., inputting, processing, and outputting the image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device which comprises image data input means for inputting sets of image data to be included in a single printout page, image data storage means for storing the sets of input image data received from said image data input means, image data confirmation means for confirming characteristics of each of the sets of input image data, management table means for managing on an image basis as each of the sets of image data is inputted from the image data input means the characteristics of each of the sets of input image data confirmed by said image data confirmation means with reference to the corresponding each of the sets of input image data stored in said image data storage means, and image processing means for performing image processing with respect to said each of the sets of input image data, wherein:
  said image processing means has a processing mode for generating a single printout page including the sets of input image data; and
  in a case where input of an image is interrupted by a trouble, said management table means recognizes which image data has not been inputted and manages input image data re-inputted after said interruption, in connection with each of the sets of input image data stored in said input data storage means, and said image processing means performs image processing with respect to said re-inputted image data.

2. The image processing device as set forth in claim 1, further comprising mode setting means for setting a processing mode of said image processing means.

3. The image processing device as set forth in claim 2, wherein said management table means further includes a mode management section for managing a processing mode set by said mode setting means as management information of each input image data, with respect to the corresponding each input image data stored in said data storage means.

4. The image processing device as set forth in claim 3, wherein said image processing means further includes an image processing management section for performing image processing with respect to said each input image data based on said management information managed by said management table means.

5. The image processing device as set forth in claim 4, further comprising image output means for outputting said each image data processed by said image processing means, wherein said management table means further includes a management output section for outputting each processed input image data from said image output means, according to the management information.

6. The image processing device as set forth in claim 5; wherein said management table means produces at least one table selected from the group consisting of:
  an image input table for managing information relating to each input image data and processing conditions for each input image data;
  an image process table for managing the contents of the image processing to be performed with respect to each input image data and information relating to each input image data that has undergone image processing; and
  an image output table for managing information relating to the output of each input image data that has undergone image processing.

7. The image processing device as set forth in claim 6, wherein said image input table includes at least one item of information selected from the group consisting of:
document ID information indicating an identification number for identifying each page associated with each input image data;
document side information indicating whether each input image data represents image data from a front side or a back side of a document;
document size information indicating a size of each input image data;
scaling factor information indicating a scaling factor when each input image data is scaled up or down;
read image number information indicating how many image data are inputted through said image data input means to form image data contained one page;
input request information indicating whether a request for transmitting each input image data has been given to said information processing means; and
input completion information indicating whether each input image data is completely inputted through said image data input means.

8. The image processing device as set forth in claim 6, wherein said image process table includes at least one item of information selected from the group consisting of:
image ID information indicating an identification number for identifying each page containing each input image data;
process information indicating the contents of processing to be performed on each input image data contained on each page;
process ID information indicating a location in a second image data storage means where processed data of each image data is stored; and
process completion information indicating whether the image processing with respect to each input image data is completed.

9. The image processing device as set forth in claim 6, wherein said image output table includes at least one item of information selected from the group consisting of:
output image ID information indicating an identification number for identifying each page containing each processed input image data;
sheet side information indicating whether each input image data is to be recorded on a front side or a back side of a sheet;
print size information indicating the size of a sheet on which each input image data is to be recorded;
print number information indicating a number of each input image data to be outputted;
output request information indicating whether each processed input image data is requested by said image output means;
output completion information indicating whether each processed input image data has been outputted as instructed;
memory release information indicating whether clearance of each processed input image data from said second image data storage means is permitted; and
output ID information indicating a location in said second image data storage where a final version of each processed input image data to be outputted is stored.

10. The image processing device as set forth in claim 1, wherein each input image data is image data of a document suitable for reading; and
said image data input means is document image reading means for reading a document image.

11. The image processing means as set forth in claim 1, wherein each input image data is image data for use in a computer, and
said image data input means is interface means for receiving data from a computer.

12. The image processing device as set forth in claim 1, wherein each input image data is image data for use in a facsimile machine, and
said image data input means is facsimile interface means for receiving data from a facsimile machine.

13. An image processing device, comprising;
image data input means for inputting sets of first image data to be included in a single printout page;
management table means for managing each of the sets of first image input data on an image basis as each of the sets of first image data is inputted from the image data input means;
first image data storage means for storing each of the sets of inputted first image data;
image data processing means for carrying out image processing with respect to each of the sets of first inputted image data, wherein said image processing means has a processing mode for generating a single printout page including the sets of first image data; and
second image data storage means for storing second image data obtained by said image processing with respect to said first image data, which is carried out by said image data processing means; wherein
in a case where input of an image is interrupted by a trouble, said management table means recognizes which image data has not been inputted and manages input image data re-inputted after said interruption, in connection with each of the sets of first image data stored in said first image data storage means, and
said image data processing means performs image processing with respect to the re-inputted input image data stored in said first image data storage means,
the image processing device further comprising:
processing completion information management table means for managing processing completion information indicative of the completion of image processing with respect to said each of the sets of first input image data by said image processing means in connection with the corresponding each of the sets of second input image data stored in said second image data storage means.

14. The image processing device as set forth in claim 13, comprising:
image output means for outputting each processed input image data from said second image data storing means,
wherein said management table means further manages output request information indicative of a request for outputting the each processed input image data from said image output means, and output completion information indicative of the completion of an output of each processed input image data in connection with the corresponding each processed input image data stored in said second image data storage means.

15. The image processing device as set forth in claim 1, further comprising:
second image data storing means for storing each input image data processed by said image processing means,
wherein said management table means further includes a post image processing data management section for managing each processed input image data stored in said second image data storage means in connection with the corresponding management information.

16. The image processing device as set forth in claim 1, further comprising:

second image data storage means for storing each processed input image data processed by said image processing means; and image output means for outputting each processed input image data from the second image data storage means, wherein:

said management table means manages the output request information indicative of a request for outputting each processed input image data from the image output means, and output completion information indicative of the completion of an output of each processed input image data, in connection, with the corresponding each processed input image data stored in said second image data storing means.

* * * * *